United States Patent [19]
Hista

[11] Patent Number: 4,518,561
[45] Date of Patent: May 21, 1985

[54] REACTOR BUILDING
[75] Inventor: Jean C. Hista, Versailles, France
[73] Assignee: Framatome et Cie, Courbevoie, France
[21] Appl. No.: 346,114
[22] Filed: Feb. 5, 1982
[30] Foreign Application Priority Data
Feb. 10, 1981 [FR] France ................. 81 02580
[51] Int. Cl.³ .............................................. G21C 19/20
[52] U.S. Cl. ..................................... 376/293; 376/285
[58] Field of Search ..................... 376/285, 293, 296
[56] References Cited

U.S. PATENT DOCUMENTS

| | | | |
|---|---|---|---|
| 3,232,843 | 2/1966 | Went et al. ......................... | 376/293 |
| 3,258,403 | 6/1966 | Malay ................................. | 376/293 |
| 3,713,968 | 1/1973 | Kennedy et al. .................... | 376/293 |
| 4,033,815 | 7/1977 | Webber et al. ..................... | 376/293 |
| 4,259,154 | 3/1981 | Niino et al. ........................ | 376/293 |
| 4,343,681 | 8/1982 | Clermont et al. .................. | 376/293 |

FOREIGN PATENT DOCUMENTS

| | | | |
|---|---|---|---|
| 2315318 | 3/1973 | Fed. Rep. of Germany . | |
| 2326907 | 12/1974 | Fed. Rep. of Germany ...... | 376/293 |
| 1501264 | 11/1966 | France . | |
| 2226729 | 4/1974 | France . | |
| 544382 | 12/1973 | Sweden . | |

OTHER PUBLICATIONS

Nuclear Engineering International, Dec. 1970, p. 991, FIG. 5.
La Revue Polytechnique No. 1383, (3/79), pp. 247,249,251,253,255, Pavot et al.

*Primary Examiner*—Sal Cangialosi
*Attorney, Agent, or Firm*—Pearne, Gordon, Sessions, McCoy, Granger & Tilberry

[57] ABSTRACT

Reactor building structure comprising a ring building roof embedded in the cylindrical skirt of the confinement enclosure.

The structure is constituted by a confinement enclosure comprising a cylindrical skirt and a dome, as well as by a ring building surrounding the confinement enclosure. The ring building comprises a cylindrical skirt and a roof, the confinement enclosure and the ring building being erected on a common general foundation raft or floor. The internal structures are positioned with the confinement enclosure. The roof of the ring building is toroidal or frustum-shaped, being embedded in the cylindrical skirt of the confinement enclosure. The internal structures are disengaged from the confinement enclosure.

6 Claims, 1 Drawing Figure

U.S. Patent     May 21, 1985     4,518,561
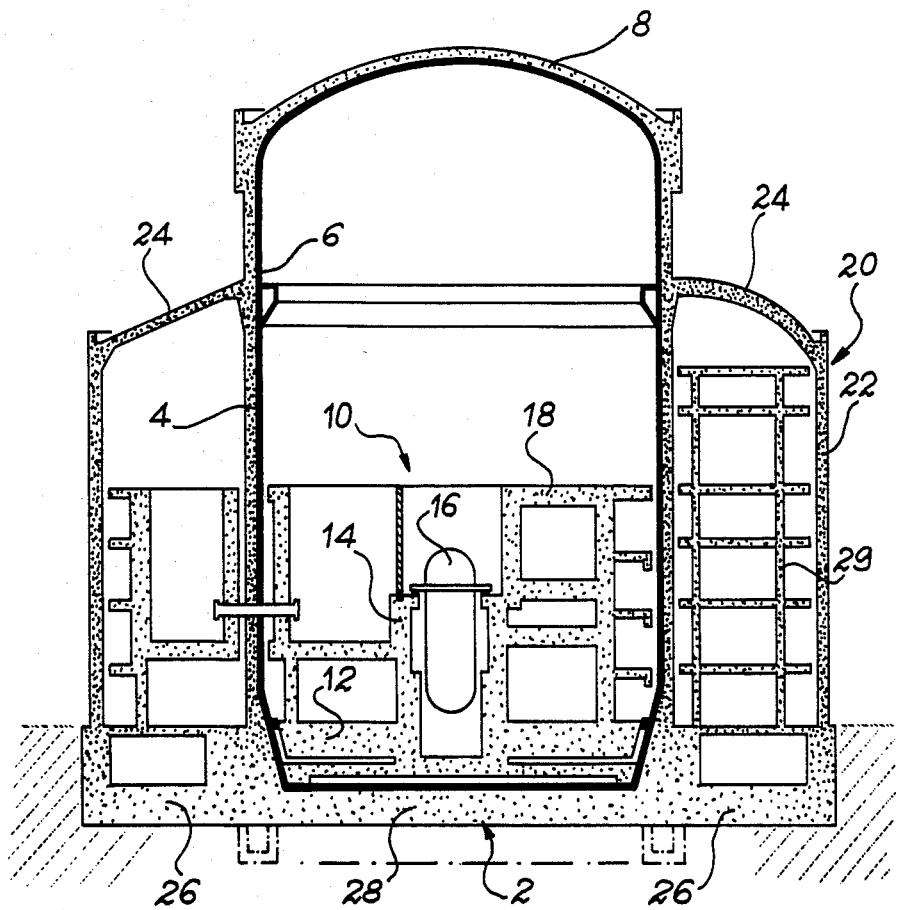

REACTOR BUILDING

BACKGROUND OF THE INVENTION

The invention relates to a reactor building construction comprising a ring building roof embedded in the cylindrical skirt of the confinement enclosure.

In general terms, the building in which a nuclear reactor is installed comprises a confinement enclosure within which are placed internal structures supporting the components of the primary circuit. In general, a ring building containing most of the auxiliary and safety systems surrounds the confinement enclosure. Preferably, the confinement enclosure and ring building are constructed on a joint foundation raft or floor, which obviates the problem of different settlement levels which would occur with foundations on independent rafts or floors.

A construction of this type is described in French Pat. No. 2,226,729, filed on Apr. 18th 1974 and entitled "Nuclear power station with a protective envelope surrounded by a concrete building" in the name of the SIEMENS AKTIENGESELLSCHAFT. This patent describes a nuclear reactor building construction having a protective envelope and a concrete building surrounding the latter, whilst forming therewith an annular space containing ancillary installations and in particular emergency cooling devices. The concrete building and the concrete protective envelope have a joint concrete foundation. The concrete building bears on the concrete cylinder and has a flat roof in the bearing zone.

BRIEF SUMMARY OF THE INVENTION

The invention relates to a building construction for a nuclear reactor making it possible to still further improve the protection in the case of an earthquake and against large missiles from the outside.

More specifically, the nuclear reactor building structure constituted by a confinement enclosure comprises a cylindrical skirt sealed in its upper part by a dome, a ring building surrounding the confinement enclosure and which is constituted by a cylindrical skirt and a roof connected to the cylindrical skirt of the confinement enclosure, whereby the latter and the ring building are erected on a common foundation raft or floor, and internal structures positioned within the confinement enclosure, wherein the ring building roof has a frustum or toroidal shape and is embedded in the cylindrical skirt of the confinement enclosure, the internal structures being disengaged from the skirts of the confinement enclosure and the ring building.

Preferably, the foundation raft or floor comprises a high-inertia honeycombed or cellular part positioned below the ring building and a solid part, lowered with respect to the cellular part and positioned beneath the confinement enclosure.

DESCRIPTION OF THE DRAWING AND PREFERRED EMBODIMENTS

The invention is described in greater detail hereinafter relative to non-limitative embodiments and the attached drawing, in the form of a sectional view of the reactor building structure.

This reactor building structure comprises a general foundation raft or floor 2 on which is erected a confinement enclosure 4. The latter comprises a cylindrical skirt 6 sealed by a dome 8 in its upper part. The function of the confinement enclosure is to prevent any leak of radioactive substances in the case of an accident and to withstand pressure and temperature effects resulting from a possible fracture of the primary or secondary circuits.

The confinement enclosure houses the internal structures 10, which essentially comprise a so-called internal structure floor 12, a vessel well 14 surrounding and supporting reactor vessel 16 and casemates 18 positioned around the said well.

The ring building 20 surrounding confinement enclosure 4 is erected around the latter. This ring building comprises a cylindrical skirt 22 erected on the foundation raft 2 and a roof 24 connected to skirt 6 of the confinement enclosure. Within the ring building are installed auxiliary means associated with the protection of the reactor or having a high radiological risk.

Confinement enclosure 4, ring building 20 and internal structures 10 are installed on the general foundation raft or floor 2, thereby overcoming the problem of different settlements which could occur if they were erected on independent floors or rafts.

This structure provides protection against missiles striking the reactor building and auxiliary means linked with the protection of the reactor or having a high radiological risk. The missile in question could even be a military aircraft which, during impact, would have a static load equivalent to 1100 metric tons distributed over 7 m².

According to the invention, the roof 24 of the ring building is embedded in the cylindrical skirt 6 of the confinement enclosure. The ring building roof is fixed to the confinement enclosure by means of meridian passive reinforcing members anchored on either side of the embedding or fixing section.

Rendering the ring building integral with the confinement enclosure offers the following advantages:

(1) In the case of a fall of an external missile, it improves the performance of the ring building roof 24.
(2) As the mass in question is greater, the relative displacements of the assembly formed by the confinement enclosure and the ring building are smaller with respect to the structures.
(3) The vibration mode of the assembly formed by the confinement enclosure and the ring building is at a higher frequency than those of each structure taken in isolation, so that the structure has a reduced response level to earthquakes.
(4) It prevents the development of complex vibration modes in the raft or floor.
(5) For ventilation reasons and due to the contamination risks of certain rooms located at the final level of the ring building, a building structure in which the confinement enclosure and ring building are not integral, makes it necessary to have an air-tight joint at the junction of the ring building roof and the confinement enclosure skirt, this constraint not existing if embedding is used.

Preferably, the joining level coincides with the brackets of the handling bridge of the reactor building.

The roof 24 of the ring building 20 has a toroidal or frustum shape, as shown in the drawing. It can have a single or double curvature.

The internal structures 29 of the ring building are disengaged from the confinement enclosure skirt and the ring building envelope. Thus, in the case of impact by a missile, it is possible to integrally benefit from the hull effect produced by the shape of the envelope, the high forces and loads are not transmitted to the internal structures 29 and they are not directly shaken or loosened. Finally, this disengagement permits the free development of dimensional variations of the envelope 5 with respect to the internal structures 29 under the action of contraction and heat.

The general foundation raft or floor 2 comprises two parts having different designs. Beneath the ring building 20, there is a high-inertia honeycombed or cellular raft or floor part 26, the honeycombs or cells being used for the installation of certain protective and safety equipment. Beneath the confinement enclosure 4, there is a solid raft or floor part 28, which is lowered with respect to the first-mentioned part. The lowering of part 26 of the raft compared with the solid part 28 makes it possible to lower the level of the assembly of internal structures 10 and ring building 20, as well as the components supported by them. Thus, the height of the ring building is reduced. By lowering the centre of gravity level of the masses of the ring building, it is possible to reduce the stresses therein in the case of seismic shocks.

Due to its considerable rigidity, the cellular raft or floor undergoes little deformation which makes it possible to ensure the mechanical stability of the embedding of the ring building covering in the confinement enclosure skirt.

Thus, there is only slight differential vertical deformation between the point of the raft or floor level with the confinement enclosure skirt and the point of the raft or floor level with the ring building envelope. Thus, the supports of the ring building roof constituted by the confinement enclosure and the ring building envelope skirt has a difference in level which is sufficiently small not to produce significant stresses level with the fixing of the ring building roof on the confinement enclosure.

In the case of an accident or incident producing an overpressure in the confinement enclosure, the latter is grouped or banded by the ring building roof, which then supports the circumferential tensile stresses, whose value decreases as from the fixing or embedding point.

In the case of particularly large missiles, such as e.g. a military aircraft, the embedding or fixing of the ring building roof to the confinement enclosure skirt makes it possible to significantly reduce the weight of the ring building envelope structure.

There are two embodiments of the reactor building construction according to the invention. According to a first embodiment, the confinement enclosure and ring building are made from reinforced concrete. According to a second embodiment, the confinement enclosure is made from concrete which is prestressed in the horizontal and vertical directions, whilst the ring building is made from reinforced concrete.

Compared with a confinement enclosure made from prestressed concrete, the embodiment in which the structure is made from reinforced concrete makes it possible to eliminate the prestressing ribs, which cause a problem for the installation in the ring building.

For part of the confinement enclosure positioned above the ring building and which must be able to resist the impact of the missile, the passive reinforcing members are dimensioned so as to withstand the greatest possible load, e.g. in the case of an earthquake or large missile. In the case of a prestressed concrete confinement enclosure, there are two types of reinforcing members, namely prestressed members for the reference accident and passive reinforcing members for the missile. For this first embodiment, there is no need to provide a provisional roof for the ring building.

During the concreting of the confinement enclosure skirt, weighting reinforcing members are provided to the right of the ring building roof and can be either in the form of traditional reinforcing members or in the form of Caldwell sleeves.

In the case of the second embodiment, the prestressing of the confinement enclosure takes place before the production of the embedding in such a way that only the prestressing deformations or creep act on the complete structure. The stresses resulting from the differential contraction of the ring building envelope compared with the confinement enclosure and by the creep under the prestressing of the confinement enclosure have an opposite sign and therefore partly neutralize one another.

Bearing in mind the constructional requirements, in the case of the construction of this second embodiment it must be ensured that the ring building is out of the water before completing the prestressing of the confinement enclosure. Therefore, a partly or completely tight provisional roof must be provided, which serves as shuttering for the final roof, which can then be concreted after completing the prestressing of the confinement enclosure. It is then possible either to integrate this provisional roof into the final roof or to dismantle it after concreting the final roof.

What is claimed is:

1. A building structure for a nuclear reactor constituted by a confinement enclosure comprising a cylindrical skirt sealed in its upper part by a dome, a ring building surrounding the confinement enclosure and which comprises a cylindrical skirt and a roof connected to the cylindrical skirt of the confinement enclosure, the latter and the ring building being erected on a common general foundation raft or floor, and internal structures positioned within the confinement enclosure, said internal structures being disengaged from said confinement enclosure, wherein the roof of the ring building is toroidal or frustum-shaped and is embedded in the cylindrical skirt of the confinement enclosure.

2. A building structure according to claim 1, wherein the general foundation raft or floor comprises a high-inertia honeycombed or cellular part located beneath the ring building and a solid part, lowered with respect to the cellular part and positioned beneath the confinement enclosure.

3. A reactor building structure according to claims 1 or 2, wherein the confinement enclosure and ring building are made from reinforced concrete.

4. A reactor building structure according to claims 1 or 2, wherein the confinement enclosure is prestressed in the horizontal and vertical directions, and wherein the ring building envelope is made from reinforced concrete.

5. A building structure according to claim 1, wherein the embedding level of the ring building in the confinement enclosure skirt coincides with the supports of the handling ridge for the reactor building.

6. A reactor building structure according to claim 1, wherein the internal structures of the ring building are disengaged from the ring building skirt, the roof of said building and the confinement enclosure skirt.

* * * * *